United States Patent
Goossen (10) Patent No.: US 9,473,918 B2
(45) Date of Patent: Oct. 18, 2016

(54) WILDFIRE RESOURCE TRACKING APPARATUS AND METHOD OF USE THEREOF

(71) Applicant: Rodney Goossen, Lakewood, CO (US)

(72) Inventor: Rodney Goossen, Lakewood, CO (US)

( * ) Notice: Subject to any disclaimer, the term of this patent is extended or adjusted under 35 U.S.C. 154(b) by 0 days.

(21) Appl. No.: 14/518,571

(22) Filed: Oct. 20, 2014

(65) Prior Publication Data

US 2016/0112853 A1    Apr. 21, 2016

(51) Int. Cl.
    *H04W 4/22*     (2009.01)
    *H04B 7/185*    (2006.01)
    *H04W 4/02*     (2009.01)
    *G06T 11/20*    (2006.01)

(52) U.S. Cl.
    CPC .............. *H04W 4/22* (2013.01); *G06T 11/203* (2013.01); *H04B 7/18517* (2013.01); *H04W 4/02* (2013.01)

(58) Field of Classification Search
    CPC ............................ H04W 4/22; H04B 7/18517
    USPC .............................................. 455/404.2, 90.1
    See application file for complete search history.

(56) References Cited

U.S. PATENT DOCUMENTS

| | | | | |
|---|---|---|---|---|
| 7,263,379 B1* | 8/2007 | Parkulo | ............. | G08B 21/02 340/501 |
| 2003/0158635 A1* | 8/2003 | Pillar | .............. | A62C 27/00 701/1 |
| 2005/0003797 A1* | 1/2005 | Baldwin | ............. | H04W 76/007 455/404.1 |
| 2005/0189122 A1* | 9/2005 | Wippich | .............. | G08B 17/005 169/43 |
| 2009/0021425 A1* | 1/2009 | Cameron | ............... | G08B 25/08 342/357.43 |
| 2009/0221263 A1* | 9/2009 | Titus | .................... | G08B 25/006 455/404.2 |
| 2011/0294461 A1* | 12/2011 | Cradick | ............. | H04W 76/007 455/404.2 |
| 2012/0212339 A1* | 8/2012 | Goldblatt | ............. | G08B 25/016 340/539.11 |
| 2012/0309341 A1* | 12/2012 | Ward | ..................... | H04W 4/22 455/404.2 |
| 2014/0011469 A1* | 1/2014 | Fenn | ...................... | H04W 4/22 455/404.1 |
| 2014/0027131 A1* | 1/2014 | Kawiecki | ............. | A62C 3/0242 169/45 |
| 2015/0149320 A1* | 5/2015 | Smirin | ................... | G06Q 20/14 705/26.8 |

* cited by examiner

*Primary Examiner* — Christopher M Brandt
(74) *Attorney, Agent, or Firm* — Kevin Hazen (57) ABSTRACT

The invention comprises an integrated and distributed wildfire fighting system used in gathering information related to firefighting resources, developing a strategic plan, and/or communicating directions to and/or between resources. Communicators linked to positions of natural resources, personnel, and/or equipment are used to communicate identification, position, capability, and/or status of individual resources to a main controller via satellite and/or aircraft. The communicators additionally facilitate communication between personnel, teams of personnel, levels in a firefighting hierarchy, and/or with automated equipment. Further, drop ball communicators are used to transmit localized information, such as weather, a fire-retardant drop request, and/or a call for emergency aid to nearby resources, an aircraft, and/or to a main controller.

21 Claims, 6 Drawing Sheets

WILDFIRE RESOURCE TRACKING APPARATUS AND METHOD OF USE THEREOF

BACKGROUND OF THE INVENTION

1. Field of the Invention

The invention relates to command and control of firefighting resources.

2. Discussion of the Prior Art

Since 2010, annual expenditures for suppressing and fighting wildfires has exceeded one billion dollars annually in the United States alone. Despite the expenditure, annual loss of natural resources, real property, and/or life continues to be staggering.

Problem

What is needed is an integrated distributed ground system for obtaining, locating, determining capability of, distributing, and/or instructing use of firefighting resources.

SUMMARY OF THE INVENTION

The invention comprises an integrated and distributed command and control firefighting communication system.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a firefighting command and control communication system and/or elements thereof.

In one embodiment, a controller is used to communicate information, such as a plan and/or information about a first resource, to another resource, such as a firefighter. Several non-limiting examples are provided to further clarify the first embodiment. In a first example, information on a large number of resources is gathered by a controller and subsequently subsets of the gathered information are distributed to one or more groups, such as to a chief, manager, leader, strike team, and/or individual firefighter. In a second example, individual resources are provided with a corresponding individual identifier and/or a corresponding individual communicator, where the individual communicator communicates status and/or capability of the individual resource to additional local resources, to a local controller, and/or to the main controller using a local communication link, via an aircraft, and/or via a satellite. In a third example, a group of resources is provided with a corresponding group identifier and/or a corresponding group communicator, where the group communicator communicates status and/or capability of the group to the main controller, to a higher level of a hierarchy, to a lower level of a hierarchy, and/or to a second localized group. In a fourth example, any permutation and/or combination of elements of the wild land fire resource organization and/or distribution of the wildfire resources described herein is optionally used.

In another embodiment, a drop locator, also referred to as a drop ball, is used to communicate a position, a fire status, a need level, and/or a vector related to a local setting to a controller, such as via aircraft communication and/or via satellite communication.

In yet another embodiment, an integrated and distributed wildfire fighting system is used in gathering information related to firefighting resources, developing a strategic plan, and/or communicating directions to and/or between resources. Communicators linked to positions of natural resources, personnel, and/or equipment are used to communicate identification, position, capability, and/or status of individual resources to a main controller via satellite and/or aircraft. The communicators additionally facilitate communication between personnel, teams of personnel, levels in a firefighting hierarchy, and/or with automated equipment. Further, drop ball communicators are used to transmit localized information, such as weather, a fire-retardant drop request, and/or a call for emergency aid to nearby resources, an aircraft, and/or to a main controller.

Herein, firefighting command and control is the exercise of authority and/or direction by a properly designated leader, such as an incident commander, over assigned firefighting resources in the process and accomplishment of wildfire suppression and/or wildfire control.

Figure 1:
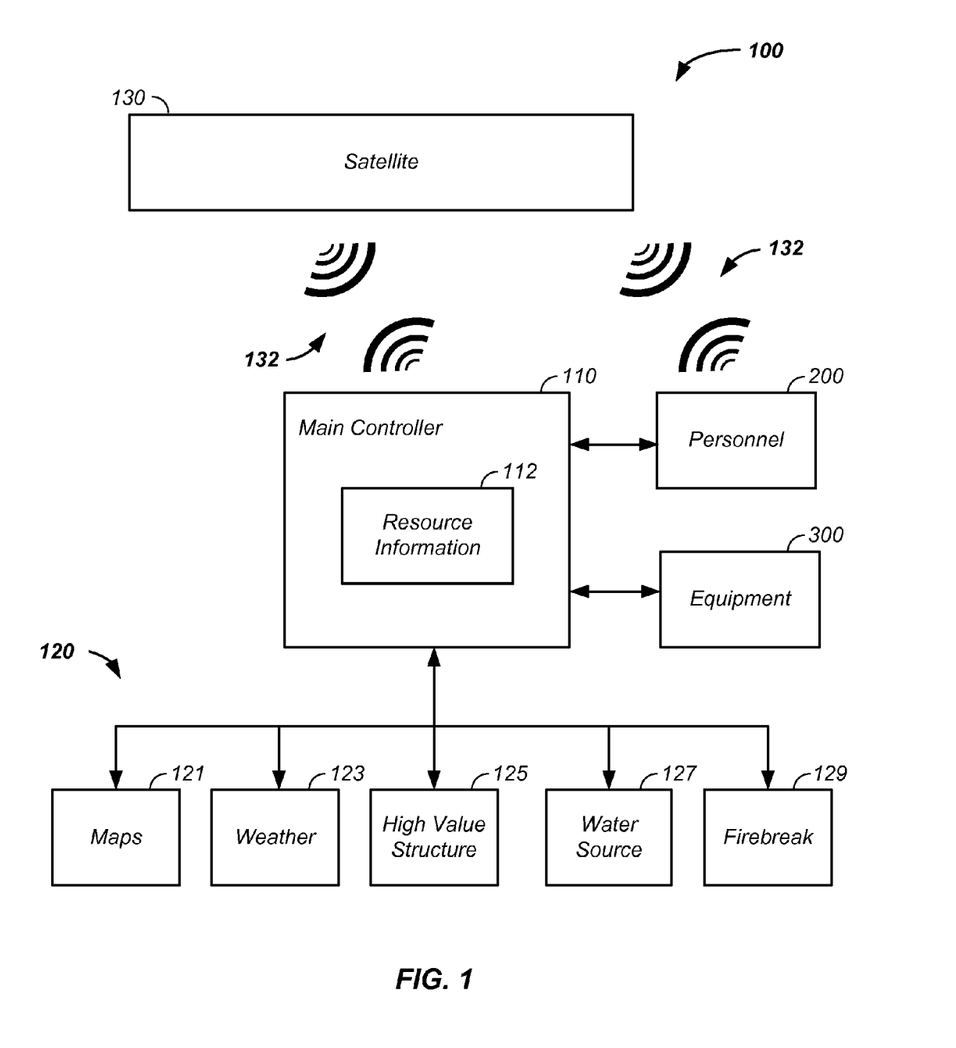
FIG. 1 illustrates a wildfire suppression command and control system.

Referring now and throughout to FIG. 1, a wildfire fighting system 100, such as an integrated and distributed command and control firefighting communication system is described. In the wildfire fighting system 100, a controller, such as a main controller 110 or local controller, gathers resource information 112 and distributes the resource information 112. Herein, resource information 112 includes:

(1) any location information 120 related to a fire, such as a coordinate on a map 121, information about localized weather 123, such as wind speed or weather radar information; information on a high value structure 125; information about a local water source 127; and/or information about on a firebreak 129;

(2) any information related to personnel 200 used to fight the fire; and/or (3) any information related to equipment 300 used to fight the fire.

Information about one or more resource and/or directions to the one or more resource is optionally and preferably communicated to a receiving resource via an airborne communication system, vehicle, satellite, and/or spacecraft. Herein, for clarity of presentation and without loss of generality, a satellite 130, such as a low earth orbiting satellite, is used to refer to the communication medium, such as a helicopter, airplane, communication balloon, and/or communication satellite. Further, wireless communication 132, for clarity of presentation and without loss of generality, between the main controller 110 and a resource and/or between two or more resources is used to refer to any electromagnetic signal sent through the atmosphere, such as a radio-wave. Elements of the wildfire fighting system 100 are further described, infra.

Still referring to FIG. 1, in one embodiment the wildfire fighting system 100 is an analog or species of the Distributed Common Ground System-Army (DCGS-A) used by the military, for command and control of the military, where the wildfire fighting system is used to facilitate communication of the resource information 112 and/or firefighting plan between the main controller 110 and a receiving resource. However, the wildfire fighting system 100 uses a different wavelength, encryption method, software package, authority, personnel, and/or satellite than the DCGS-A system. In one example, one or more existing military satellites are used in the wildfire fighting system 100. In a second example, a dedicated satellite and/or a dedicated subsystem of a satellite is used in the wildfire fighting system 100.

Communication System

Still referring to FIG. 1, the main controller 110/satellite 130 communication of the wildfire system 100 is optionally a cloud-type interface for sending and/or receiving resource information 112, such as information about personnel 200 and/or information about equipment 300. For example, the personnel 200 and/or the equipment 300 optionally transmit position, such as a global positioning system (GPS) position obtained with a global positioning system receiver, plan, and/or status to the main controller 110 via the satellite 130. Similarly, the main controller 110 and satellite 130 are optionally used to transmit instructions to one or more of the personnel 200 and/or to one or more pieces of the equipment 300. Communication between elements of the wildfire fighting system 100 is further described, infra.

Still referring to FIG. 1, the location information 120, information about the personnel 200, and/or information about the equipment 300 is communicated to the main controller 110. In a first example, a map 121, such as a local terrain map, is provided to the main controller 110. In a second example, weather 123, such as local rainfall, wind, and/or cloud cover is provided to the main controller 110. In a third example, information about a high value structure 125, such as a house, bridge, historical site, and/or a utility is provided to the main controller 110. In a fourth example, location of a local water source 127, and/or information about a firebreak 129 is provided to the main controller 110. In a fifth example, information about the personnel 200 is provided to the main controller 110. In one case, the main controller 110 is maintained with pre-existing information about the personnel 200. For instance, the name, rank, home organization, experience, specific training associated with each individual is optionally pre-loaded in the main controller 110 and/or sent via a communicator 400, described infra, to the main controller 110, such as via the satellite 130. In a second case, dynamic information about the personnel 200, such as current position and/or status is provided to the main controller 110. Optionally and preferably the dynamic information is provided to the main controller 110 using the wildfire fighting system 110. More particularly, optionally and preferably continuous, periodic, and/or on demand personnel activated status and/or position of one or more of the personnel 200 is provided to the main controller 110 via communication passed to and relayed by the satellite 130. In a sixth example, information about the equipment 300 is provided to the main controller 110, where the information about the equipment 300 is generic to the equipment 300, such as a capability of the equipment 300, and/or is dynamic equipment information about the status and/or location of the equipment 300. The status/location of the equipment is optionally sent via an uplink to the satellite 130 and relayed to the main controller 110 on a continuous, periodic, and/or on an as needed basis. Generally, information deemed pertinent to fighting a wildfire is provided to the controller. The provided information is received by the controller directly, through use of a database, and/or via use of a communication system.

Still referring to FIG. 1, the controller or main controller 110 is optionally any hardware/software package used by at least one member of the personnel 200, such as a commander, in strategic and/or tactical distribution and control of the personnel 200 and/or the equipment 300. The main controller 110 is optionally and preferably a full-sized computer equipped with one or more display screens. The display(s) are optionally configured with computer code implemented options to: view terrain, view a fire perimeter, view all or any subset of the personnel 200, view all or any subset of the equipment 300, view all or any subset of the location information 120, view local and/or regional weather, view any resource or subset thereof contained with the main controller, allow multiple command center access points to simultaneously view specialty subset information for a given operator, equipped with zoom functions, is linked to other command centers, and/or is equipped with communication links to a higher level authority and/or to any of the personnel 200 and/or to any automated equipment, such as a firefighting drone or robot. Additionally, the main controller 110 facilitates communication related to fires on private land to state and/or federal authorities, such as the National Interagency Fire Center (NIFC).

Still referring to FIG. 1, information and/or instructions are communicated from the main controller 110 to the personnel 200 and/or to the equipment 300 or vise-versa, such as via the wireless communication 132, via an aircraft, and/or via the satellite 130. In a first example, local information related to the map 121, the weather 123, the high value structure 125, the water source 127, and/or the firebreak 129 is provided to one or more of the personnel 200 via the satellite 130. In a second example, information about a first resource is communicated to a second resource using the main controller 110, the wireless communication 132, and the satellite 130. In one case, the location information 120 is provided to the personnel 200. In a second case, information about the equipment 300 is provided to the personnel 200. In a third case, information about a first sub-group of the personnel 200 is provided to a second sub-group of the personnel 200. Generally, any element known to the main controller 110, any of the location information 120, any information about member of the personnel 200, and/or any information about an element of the equipment 300 is optionally and preferably communicated with any other element of the main controller 110, member of the personnel 200, and/or element of the equipment 300 via the satellite 130 and/or via an aircraft.

Personnel

Figure 2:
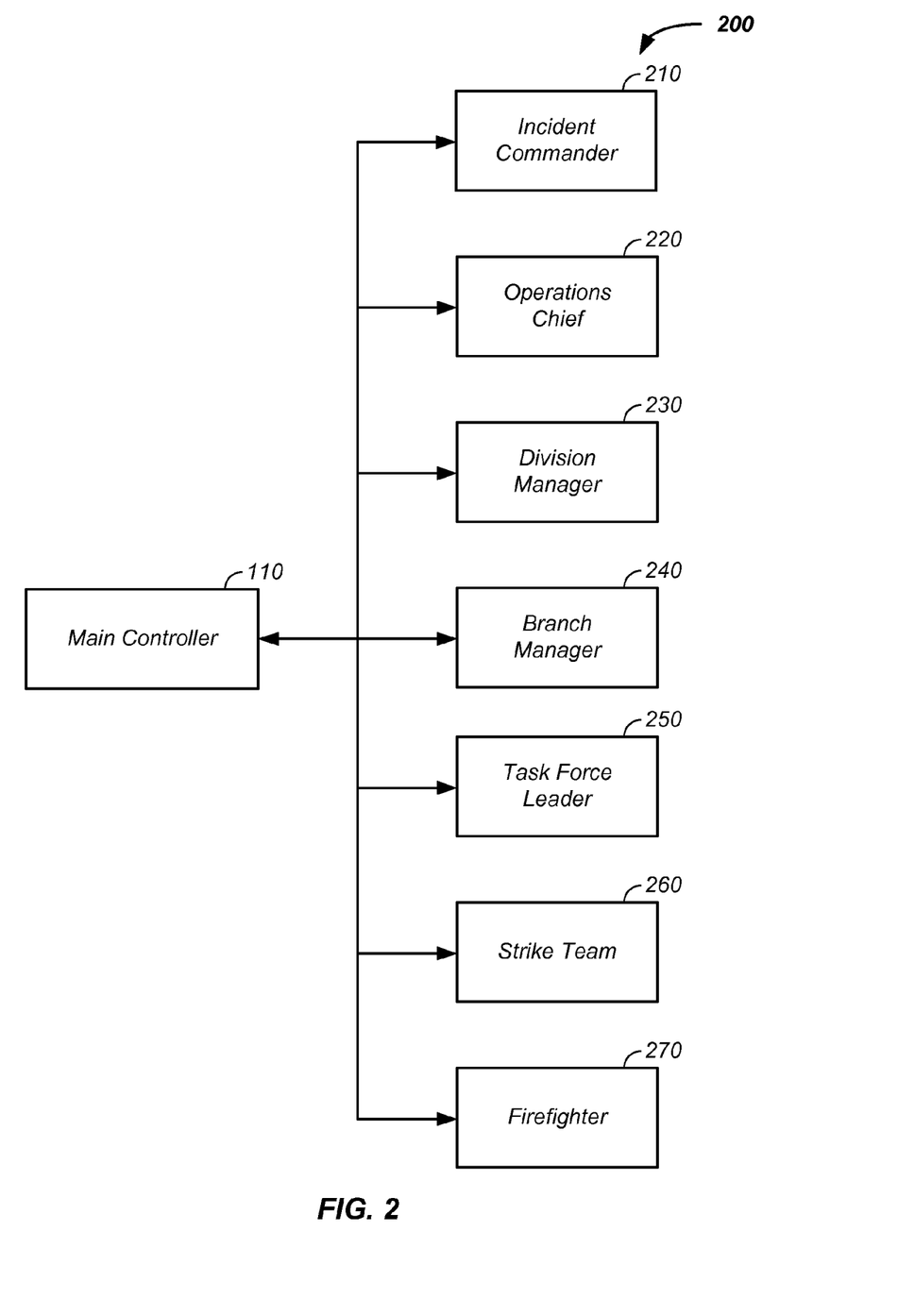
FIG. 2 illustrates control/distribution of firefighting personnel.

Referring now to FIG. 2, the personnel 200 are further described. Optionally and preferably the personnel 200 are organized in a hierarchical structure, such as through 2, 3, 4, 5 or more levels including an incident commander 210, an operations chief 220, a division manager 230, a branch manager 240, a task force leader 250, a strike team 260, and/or a firefighter 270, each level optionally containing many people. Additional levels in the hierarchy and/or fewer levels in the hierarchy are optionally used, such as dependent upon a size of a given wildfire. Any of the personnel 200 optionally communicate with the main controller 110 via the satellite 130 or aircraft or vise-versa. Further, any member or group of the personnel 200 optionally communicate directly with any other member or group of the personnel 200 via the satellite 130 or aircraft.

Equipment

Figure 3:
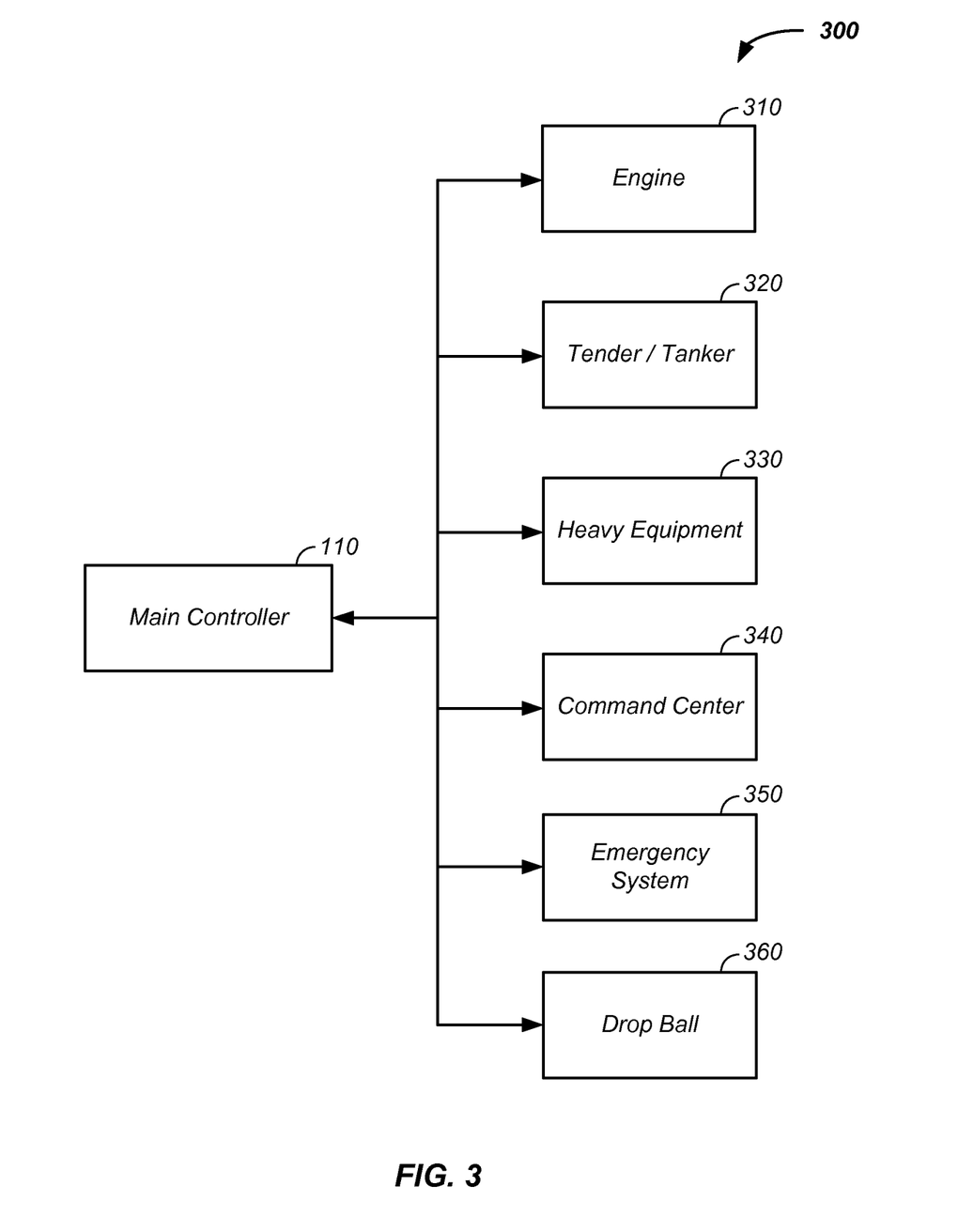
FIG. 3 illustrates control/distribution of firefighting equipment.

Referring now to FIG. 3, the equipment 300 is further described. Generally, the equipment 300 includes any physical item used by at least one member of the personnel 200. However, for clarity of presentation and without loss of generality multiple examples of the equipment are provided in FIG. 3, including an engine 310; a tender/tanker 320; heavy equipment 330, such as a bulldozer; a command center 340; an emergency system 350; and/or a drop ball 360. The drop ball 360 is further described infra. Optionally and preferably, any element of the equipment 300, such as a dozer or drone, is configured with a communicator that communicates an identifier, a position, and/or a status of the member of the equipment 300 to the main controller 110, to one or more members of the personnel 200, and/or to another member of the equipment 300, such as an automated member of the equipment 300, via the satellite 130. Optionally a drone aircraft is equipped with an environmental sensor, such as for sensing any of wind speed/direction, visibility, and temperature for use by a weather model, such as sent via the main controller 110.

Communicator

Figure 4:
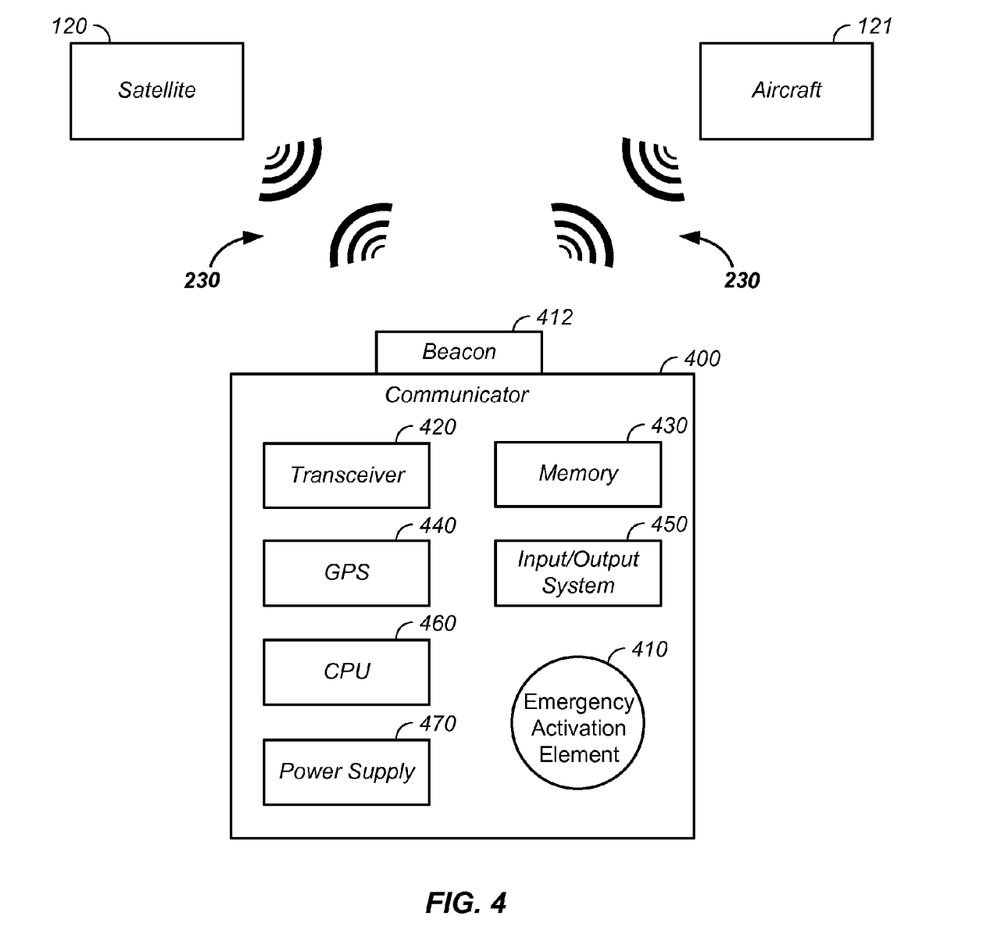
FIG. 4 illustrates a communicator.

Referring now to FIG. 4, a communicator 400 is illustrated. Any member of the personnel 200 and/or any element of the equipment 300 is optionally equipped with an individual communicator. Similarly, any group of members of the personnel 200 and/or any group of elements of the equipment 300 are optionally equipped with a group communicator. For clarity of presentation, individual communicators and group communicators are referred to herein as a communicator. The communicator 400 is any means of communicating identity, location, and/or status of the personnel 200/equipment 300 to the satellite 130 for relaying to the main controller 110 and/or to another communicator. The communicator 400 is configured to send a unique identifier address and position information associated with each resource to the main controller and/or to filed deployed tablets, such as via the satellite 130.

Still referring to FIG. 4, an example of the communicator 400 is provided. Optionally, the communicator 400 contains an emergency activation element 410, such as an emergency activation switch/button. The emergency activation element is linked to at least one of a beacon 412, such as a flashing light, and a transceiver 420 used to communicate with the satellite 130 and/or an aircraft 131. The transceiver optionally and preferably sends to the satellite information about the personnel 200 contained in memory 430, a GPS 440 location of a member of the personnel associated with a given communicator, and/or any information entered by a member of the personnel 200 via an input/output system 450 to the communicator. For instance, a firefighter 270 optionally indicates distress and/or need of rescue to the main controller 110 by activating the emergency activation element 410. Optionally, the firefighter 270 enters additional information via the input/output system 450, such as need level. An optional central processing unit (CPU) 460 and power supply 470 are optionally electrically linked to any of the aforementioned elements of the communicator 400.

Still referring to FIG. 4, the communicator 400 is optionally in the form of a tablet. For example, the input/output system is optionally of a touch screen form factor the size of a cell phone, phablet, or tablet intended to be carried and/or worn by the firefighter, such as on a forearm or wrist. In this example, the communicator is optionally configured with a screen showing surrounding terrain, weather, smoke, personnel 200, and/or equipment 300 where dynamic fire-related elements displayed on the screen are provided to the communicator by the main controller 110 via the satellite 130 on a continual, periodic, and/or on demand basis. In this manner, a first firefighter may see his/her position relative to other firefighters, the personnel 200, the equipment 300, and/or the location information 120.

Still referring to FIG. 4, the communicator 400 is optionally and preferably water resistant, waterproof, shock resistant, and/or ruggedized for field deployment.

Still referring to FIG. 4, an example of use of the communicator 400 by a firefighter 270 is provided. After the firefighter 270 activates the emergency activation element 410, the communicator sends information to the main controller 110 via the satellite 130. Optionally and preferably, the main controller 110 provides an audible and/or visual alert to a user of the main controller 110 of the received distress signal. The main controller 110 automatically and/or at the control of a user of the main controller 110 relays the distress signal and associated information, such as number of personnel affected and GPS site, to a rescue team, such as a nearby strike team 260, aircraft 121, and/or outside search and rescue team. Optionally, the distress signal is sent with priority directly to one or more nearby support units by the communicator 400. Optionally, a response from the main controller 110 is provided to the firefighter 270, such as what resources are dispatched, estimated time of arrival of the dispatched resources, capabilities of the dispatched resources, location of arrival of the dispatched resources, and/or instructions to the firefighter 270, such as a direction to move, a coordinate to move to, and/or a lifesaving strategy.

Still referring to FIG. 4, the communicator 400 optionally operates passively without interaction of the personnel 200. For example, a given communicator 400 periodically and/or on demand sends to the main controller 110 identity information, skills/capabilities, and/or location of the personnel 200 or equipment 300 associated with the given communicator. Accordingly, the main controller is continually updated with position/status of the personnel 200 and/or equipment 300 in the field, in reserve, or even in route from a remote area.

Still referring to FIG. 4, the communicator 400 is optionally configured with text/voice capabilities. For example, the display screen of the communicator 450 showing nearby resources is optionally coded to allow a visual distinction between personnel types in the hierarchy. For example, a firefighter 270 might appear in blue, a strike team encircled by a graphical perimeter, and/or a task force leader in red. One firefighter 270 may optionally select another firefighter by touching the communicator icon representing the second firefighter and either call the second firefighter or message (voice or text) the second firefighter through a connection established using the satellite 130 or aircraft 131. Similarly, the second firefighter receiving the call or message optionally observes on the second firefighter's communicator a graphical representation of the caller on his/her communicator, which is optionally overlaid with the tactical situation, such as smoke, terrain, and/or other resources. In this way, a first leader or commander may call/contact a second leader or commander based upon position without necessarily knowing the second leader or commander's name or phone number by merely selecting the icon on the touch screen of the communicator. Further, the two personnel in contact know where each other are relative to the terrain and/or resources displayed on their individual communicator, which facilitates ease, speed, and accuracy of communication in a time critical firefighting scenario. Generally, any firefighter 270 or any personnel 200 may contact in this manner any other firefighter 270 or personnel 200. The software optionally allows groups of personnel to be simultaneously contacted, such as all members of a strike team, all leaders, and/or all managers. Notably, since each communicator 400 is optionally and preferably individually coded, communications optionally occur simultaneously without being interrupted by other conversations as is the case with existing VHF and/or radio communications.

Still referring to FIG. 4, the communicator 400 is optionally installed using a quick connect/disconnect system. In one case, a magnet is used to connect the communicator to each piece of equipment. In a second case, the communicator 400 is integrated into each piece of equipment. In a third case, the communicator 400 is a wearable item. However, in a preferred case, a docking station is installed on each potential piece of equipment and the communicator is attached to the docking station or docking port when deployed. Upon mobilizing equipment at a standard check-in to a fire incident, the communicator 400 is attached to the docking port by ground-support. Upon demobilizing from the incident, each vehicle or piece of equipment goes through a standard vehicle inspection prior to being let go from the incident. At this demobilizing inspection, the ground support mechanic optionally recovers the GPS transceiver device from the vehicle and secures the device for use in the next fire incident.

Still referring to FIG. 4, the communicator 400 is optionally used to track progress of fighting a wildfire, referred to in the art as bread crumb trails. For example, historical information on position of a dozer, with or without status of use of a blade of the dozer, are provided by a communicator attached to the dozer allows a firebreak path to be established. This allows the commander at a glance to make sure that dozers are not directed to a previously developed path. Similarly, progress of a strike team is optionally recorded and shared with progress of another strike team to ensure that efforts are coordinated, such as forming a single perimeter as opposed to parallel paths.

Still referring to FIG. 4, the communicator 400 is optionally used to locate an individual even in the event of a battery and/or transceiver failure by recording a history of location signals; using the signals to learn a last know path and/or last known vector; and/or by using a software option to immediately retrieving/displaying to the commander, rescue personnel, and/or the firefighter in need a rescue a last direction from the main controller 110 and/or last communication(s) to the main controller 110. The battery itself is preferably backup up, such as with standard AA batteries. Further, one or more support vehicles is optionally configured with a battery charging/battery swap system.

Still referring to FIG. 4, the wildfire fighting system 100 is optionally used in conjunction with a traditional VHF system. For instance, communications between personnel 200 is optionally line-of-sight communication. The communicator 400 is optionally configured to first try to establish a line-of-sight communication between personnel 200. In the event of inability to communicate directly or in the event of poor reception quality, the communicator 400 is optionally configured with software that automatically or manually switched to communication via the satellite 120 and/or the aircraft 121.

Location Information

Figure 5:
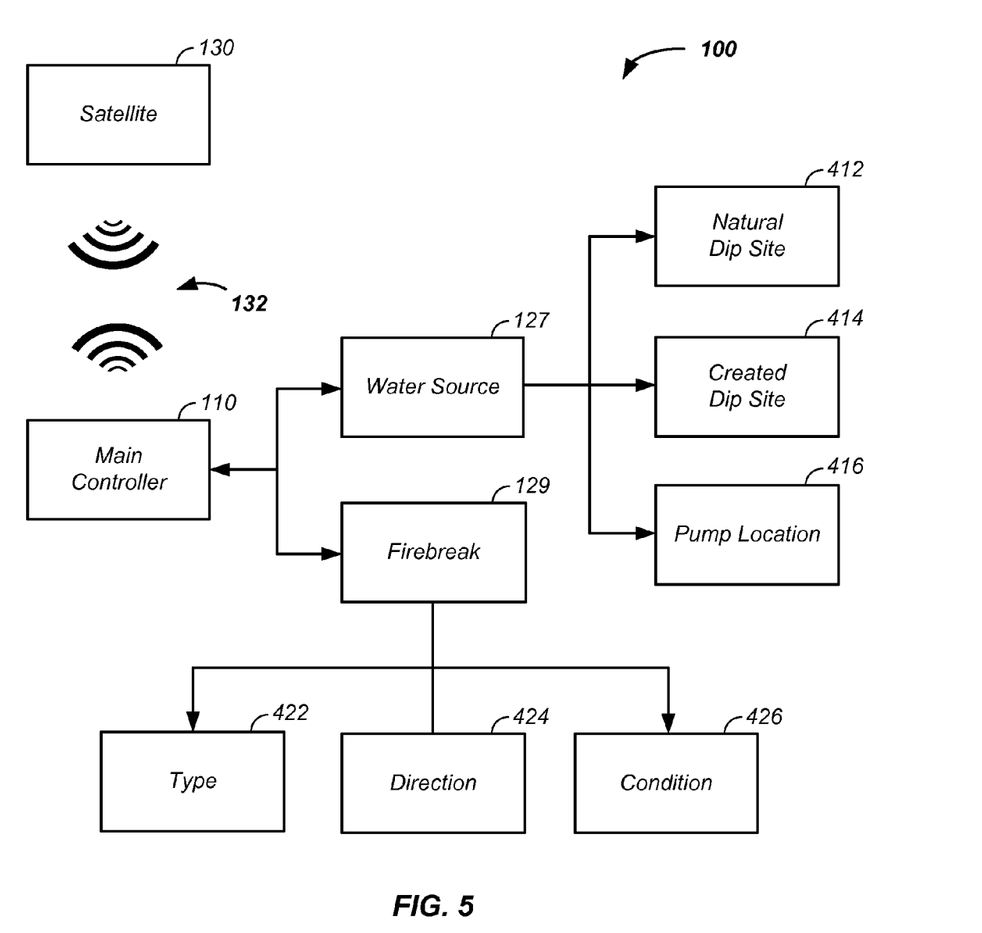
FIG. 5 illustrates communications of water and firebreak information.

Referring now to FIG. 5, the location information 120 sent and/or relayed to the main controller 110 is further described.

In a first example, information about the water source 127 is further described. The water source 127 is optionally a natural dip site 412, such as: (1) a known lake dip site or (2) an identified dip site, such as a deep area of a river. The firefighter 270 optionally relays information on the natural dip site 412 to the main controller 110 via the satellite 130 using the wildfire fighting system 100. Optionally, the firefighter 270 marks a discovered or located natural dip site location with a drop ball 360. The drop ball 360, described in additional detail infra, optionally sends a GPS location of the natural dip site 412 to the main controller 110 via the satellite 130 and the main controller 110 relays the natural dip site GPS location to a helicopter for refilling a water container for later deployment on the fire.

In a second example, information about the water source 127 is further described. The water source is optionally a created dip site 414. For instance, the main controller 110 contains and/or is provided information on a hydrant and/or pump location 416, dispatches equipment 300, such as a dozer and/or pump to the pump location 416, personnel 200 to create and fill a water basin using the dozer, and dispatches the newly created dip site location 414 to additional personnel 200, such as a helicopter crew for water refilling a bucket carrying helicopter or helitanker.

In a third example, information about the firebreak 129 is further described. Information on one or more firebreaks 129 is optionally maintained in the main controller 110 or is supplied to the main controller 110 as a firebreak 129 is created in the field. More particularly, the type 422, direction 424, and/or condition 426 of a firebreak 129 is communicated to the main controller 110. For instance, firebreak type 129 is natural, such as a ridge or river; maintained; a burned out area; or temporary. For the natural river firebreak or the temporary firebreak, the condition 426 of the break, such as river width or percent construction completed, is optionally and preferably relayed to the main controller 110.

Generally, location information 120 includes location and/or status information of non-personnel information and non-equipment information.

Drop Ball

Figure 6A:
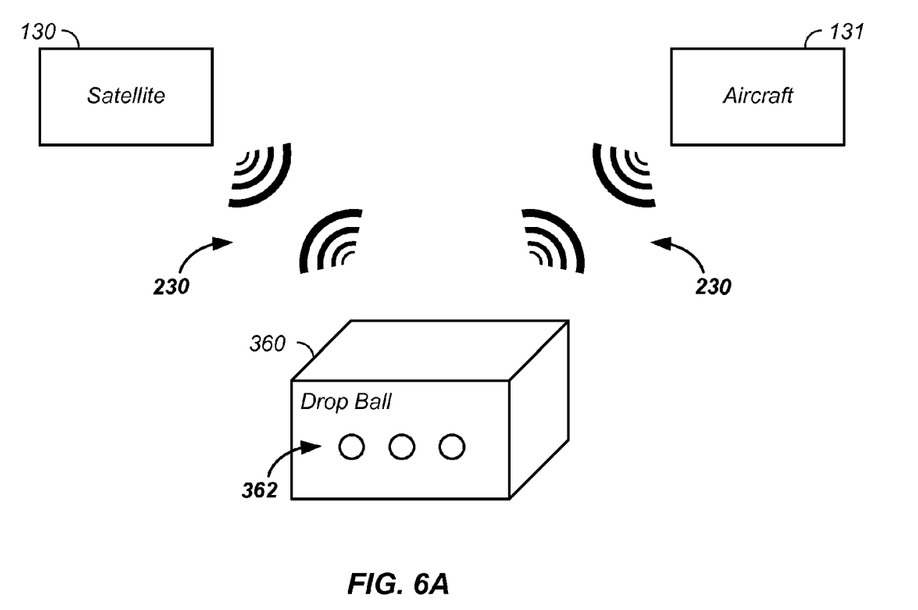
FIG. 6A and FIG. 6B illustrate a one-piece and multi-piece drop locator, respectively.
Figure 6B:
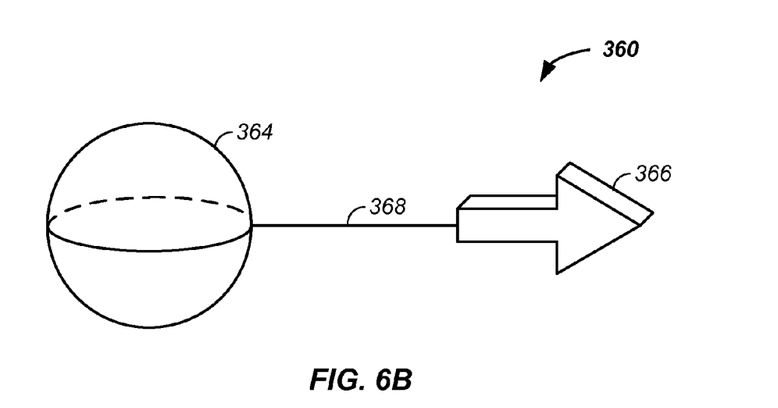

Referring now to FIG. 6A and FIG. 6B, the drop ball 360 is further described. The drop ball 360 is any portable/deployable device positioned by any member of the personnel 200 used to relay information about a location to the aircraft 121, satellite 120, and/or main controller 110 for use in firefighting tactics. Optionally and preferably, the drop ball 360 weighs less than 1, 2, 4, 8, or 16 pounds and is designed to be carried by a firefighter to a deployment site or dropped by a helicopter or drone at the deployment site. For clarity of presentation and without loss of generality, four examples are provided prior to detailing options of the drop ball 360. In a first example, the drop ball 360 is positioned by a firefighter 270 where the firefighter 270 wants an aircraft 121 to drop a fire retardant. The drop ball 270 directly and/or indirectly provides the aircraft 121 with drop zone information. In a second example, the drop ball 360 is positioned by a firefighter 270 by a dip site, such as a natural dip site 412 or a created dip site 414. Again, the drop ball, directly or indirectly, provides an aircraft 121, such as a bucket carrying helicopter with a location and/or status of a dip site. In a third example, the drop ball 360 marks an emergency extraction location. In a fourth example, the drop ball 360 marks a resource distribution location. In a fifth example, a connect-the-dot line is marked with a set of 2, 4, 8, 16, 32, 64, or more drop balls to form a requested firebreak line and to communicate the firebreak line to the main controller. The drop ball 360 is further described, infra.

Still referring to FIG. 6A and FIG. 6B, the drop ball 360 is of any geometric size and/or shape. As illustrated in FIG. 6A, the drop ball is a unit with a flat side, such as a side contacting the ground during use. As illustrated in FIG. 6B, the drop ball 360 optionally has at least one rounded surface 364 and/or is composed of two or more separated units.

Still referring to FIG. 6A and FIG. 6B, the drop ball 360 communicates: (1) with the main controller 110 via the satellite 120 and via the main controller 110 to any of the personnel 200 and/or resources 300 and/or (2) directly with nearby personnel 200. The drop ball 360 is optionally equipped with any element of the communicator 400, such as a drop ball: transceiver, memory, GPS, input/output system, CPU, power supply, and/or emergency activation element. However, the drop ball 360 is designed to be left by the firefighter 270 at a site, whereas the communicator 400 is designed to be worn: (1) by the personnel, such as on a belt, in a backpack, or within a helmet of the firefighter, or attached to the equipment 300, such as an engine 310, tanker 320, or a piece of heavy equipment. Preferably, the drop ball 360 has one or more operator controls 362, described infra.

Still referring to FIG. 6A and FIG. 6B, the operator controls 362 of the drop ball 360 are further described. The operator controls 362 optionally include any of: (1) an activation switch used to initiate operation of at least a transmitter of the drop ball 360 or to shut off the drop ball 360; (2) a personnel selectable switch, such as selector to program the drop ball 360 to transmit a signal indicating presence of: (a) a dip site, (b) a drop zone, and (c) an emergency pickup site; (3) a magnitude selector for indicating any of: (a) magnitude of a fire, (b) size of a dip site, (c) need for extraction; and/or (4) a vector selector for indicating direction and/or length of a fire retardant drop. Optionally, means for firefighter input to the drop ball 360 include use of a computer interface, such as a touch screen, a voice control, a keyboard entry, and/or a graphical user interface input.

Still referring to FIG. 6A and FIG. 6B, the drop ball is optionally a single unit, such as illustrated in FIG. 6A or a multi-piece unit, such as illustrated in FIG. 6B. Indicating direction of a fire retardant drop requires the firefighter 270 deploying the drop ball 360 to take time to orientate relative to a map and/or a compass. Hence, the drop ball 360 optionally includes a base unit 364 and a direction unit 366, optionally tethered by a length indicator 368. In use, the base unit 364 is deployed and the firefighter indicates direction of drop by positioning the direction unit 366 away from the base unit 364 in a direction. In this case, both the base unit 364 and the direction unit 366 send to the main controller 110 or aircraft 121 the unit type, base or direction, and GPS location allowing a crew of the aircraft or a fire retardant drone to know a start position and direction of a fire retardant drop. Optionally, the length indicator 368 is marked with a scale to indicate a desired magnitude of the drop and/or a desired length of a vector of a drop of the fire retardant. Again, the markings on the length indicator 368, which optionally unwinds from a coil during use, allows the firefighter 270 to provide location, magnitude, and/or vector of a desired drop of flame retardant without spending undo time in the field proximate a fire. As illustrated in FIG. 6B, the base unit 364 is optionally the shape of a ball; has an element intended to resist movement on the ground, such as an anchor shape; has a ground gripping element, such as a rough surface; and/or is labeled base and the direction unit 366 is optionally in the shape of an arrow and/or is labeled direction for immediate recognition by a well-trained fire fighter and/or recollection by a novice fire fighter. Generally, any element of the communicator 400 or the operator controls 362 are optionally integrated into any element of the multi-element drop ball.

Still referring to FIG. 6A and FIG. 6B, the drop ball 360 is optionally equipped with one or more sensors, where data from the one or more sensors is sent to the main controller 110, such as via the satellite 130. For example, the drop ball 360 optionally contains a temperature sensor, a wind speed sensor, a wind direction sensor, and/or a hygrometer. Relaying the sensor data to the main controller 110 allows localized input to a weather model and/or accurate timing/tracking of a front of a fire. For example, when a fire passes over the drop ball, the temperature sensor would see a spike in temperature, which is optionally automatically relayed to the main controller 110 along with a GPS coordinate and/or time. Thus, a set of drop balls 360 yields input data to tracking movement of a fire through wild land. In another example, wind speed, wind direction, and/or water moisture readings from the sensors is relayed to the main controller 110, such as for use in fire tracking and/or as inputs to a local weather map, where the local inputs provide highly valuable real time localized input to weather tracking/prediction models, which is in turn useful to the personnel 200 in fighting a wild fire.

Optionally drone data and drop sensor data are combined/concatenated/fused at the main controller 110.

Optionally, the main controller 110 communicates any and/or all of the collected information to a regional and/or national controller.

In addition to saving firefighter lives, the wildfire fighting system 100 will save state and federal tax dollars by decreasing injury probability and increasing efficiency of wild land firefighting. Further, the wildfire fighting system 100 will save state and federal dollars by phasing out very high frequency (VHF) radios and radio-repeaters, which have high equipment, setup, and maintenance costs. Still further, the wildfire fighting system 100 would eliminate the need of a lead aircraft to guide a fire retardant dropping airplane to a drop zone.

Still yet another embodiment includes any combination and/or permutation of any of the elements described herein.

Herein, a set of fixed numbers, such as 1, 2, 3, 4, 5, 10, or 20 optionally means at least any number in the set of fixed number and/or less than any number in the set of fixed numbers.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus for use in wildfire suppression, comprising:
   a main controller linked to a transceiver configured to communicate with a low earth orbit satellite, said main controller comprising a database; and
   a set of communicators configured to communicate with the low earth orbit satellite, individual elements of said set of communicators linked to individual firefighting resources, said firefighting resources comprising at least: (1) firefighting personnel and (2) firefighting heavy equipment, said set of communicators comprising:
      a first position communicator comprising:
         a base unit configured to be positioned at a location; and
         a vector unit configured to be positioned in a firefighter selected direction at least ten feet from said base unit, said base unit and said vector unit combining to provide location information and direction information for a requested fire retardant drop,
   wherein at least one of said base unit and said vector unit houses a first transmitter of a set of transmitters,
   each of said set of communicators comprising a corresponding transmitter of said set of transmitters, each of said set of communicators configured to send to said main controller via the low earth orbit satellite at least: (1) identifying information of the linked individual firefighting resource and (2) a global positioning system coordinate of the linked individual firefighting resource.

2. The apparatus of claim 1, a first communicator, of said set of communicators, associated with a first resource of said firefighting resources further comprising:
   an activation switch, upon activation of said activation switch, said first communicator configured to communicate to said main controller: (1) a physical pick-up request to said main controller; (2) an identity of the first resource, and (3) a GPS position of the first resource.

3. The apparatus of claim 1, said activation switch further comprising:
   an emergency activation switch, an emergency beacon light of said apparatus activated upon activation of said emergency activation switch.

4. The apparatus of claim 2, said first communicator further comprising:
   an urgency selector, said urgency selector comprising a selector indicating the urgency of the pick-up request.

5. The apparatus of claim 2, said first communicator further comprising:
   a transceiver, said transceiver configured to: (1) receive instructions from said main controller and (2) display instructions on a screen for viewing by a firefighter.

6. The apparatus of claim 5, said instructions further comprising:
   a graphical representation of local terrain about the firefighter;
   a graphical representation of the firefighter on the graphical representation of the local terrain; and
   a graphical representation of an extraction point on the local terrain.

7. The apparatus of claim 1, said set of transmitters further comprising:
   a set of transceivers, each of said set of transceivers linked to a corresponding tablet of a set of tablet computers configured to receive and display instructions from said main controller.

8. The apparatus of claim 7, further comprising at least one of:
   a belt base unit configured to hold said tablet proximate a waist of a fireman; and
   a wrist unit configured to hold said tablet about a wrist of a firefighter.

9. The apparatus of claim 1, said set of communicators comprising:
   a first communicator linked to an earth mover of said heavy equipment, said communicator configured to provide status of said earth mover, said status comprising at least one of:
      a fuel level of said earth mover;
      deployment of a blade of said earth mover to a down position, said status used by said main controller to track construction of a firebreak trail.

10. The apparatus of claim 1, said first position communicator further comprising:
    an input system electrically linked to said first position communicator for a firefighter to enter at least one of:

a vector direction of a fire retardant drop; and
a vector length of a chemical heat retardant drop.

11. The apparatus of claim 1, said first position communicator further comprising:
an environmental sensor configured to generate a signal, said environmental sensor comprising at least one of:
a temperature sensor;
a wind speed sensor;
a wind direction sensor; and
a hygrometer,
said first position communicator configured to transmit the signal to the main controller.

12. The apparatus of claim 1, said first position communicator further comprising at least one of:
a graphical representation instructing deployment of said vector unit relative to said base unit;
a visual statement indicating instruction for deployment of said vector unit relative to said base unit;
an arrow shape; and
a tether comprising a first end connected to a base unit of said first position communicator and a second end connected to said vector unit of said first position communicator, said tether comprising scale markings indicating length of the requested fire retardant drop.

13. A method for use in wildfire suppression, comprising the steps of:
linking a transceiver of a main controller with a low earth orbit satellite, said main controller comprising a database;
configuring a set of communicators to communicate with the low earth orbit satellite, individual elements of said set of communicators linked to individual firefighting resources, said firefighting resources comprising at least: (1) firefighting personnel and (2) firefighting heavy equipment, said set of communicators comprising:
a first position communicator comprising:
a base unit configured to be positioned at a location; and
a vector unit configured to be positioned in a firefighter selected direction at least ten feet from said base unit, said base unit and said vector unit combining to provide location information and direction information for a requested fire retardant drop,
wherein at least one of said base unit and said vector unit houses a first transmitter of a set of transmitters; and
configuring each of said set of communicators with a corresponding transmitter of said set of transmitters, each of said set of communicators configured to send to said main controller via the low earth orbit satellite at least: (1) identifying information of the linked individual firefighting resource and (2) a global positioning system coordinate of the linked individual firefighting resource.

14. The method of claim 13, further comprising the step of:
a first firefighter leader of said firefighting resources communicating with a second firefighter leader of said firefighting resources using said main controller and said low earth orbit satellite.

15. The method of claim 14, said step of communicating further comprising the step of:
graphically relaying a completed firefighting action relative to a terrain local to both the first firefighter leader and the second firefighter leader.

16. The method of claim 14, said step of communicating further comprising the step of:
graphically communicating a planned firefighting action relative to a graphically displayed terrain using a tablet carried by the second firefighter leader.

17. The method of claim 14, said step of communicating further comprising the steps of:
a first firefighter of the firefighting resources selecting an icon on a graphically represented local terrain about the first firefighter and the second firefighter, the icon representing a second firefighter of the firefighting resources;
said main controller establishing a communication link between the first firefighter and the second firefighter;
said second firefighter viewing on a tablet a graphical representation of the local terrain and a graphical representation of the first firefighter on the terrain.

18. The method of claim 13, further comprising the step of:
said main controller tracking said firefighting resources using: (1) the identifying information of the linked individual firefighting resource and (2) the global positioning system coordinate of the linked individual firefighting resource.

19. The method of claim 18, said linked individual firefighting resource comprising at least one of:
a fire engine;
a water tanker vehicle; and
a bulldozer.

20. The method of claim 13, further comprising the step of:
receiving communications from said firefighting resources via said set of communicators via at least one of: (1) on demand communication, (2) periodic communication, and (3) continual communication; and
using said main controller to track said firefighting resources.

21. The method of claim 13, further comprising the step of:
using said main controller to deploy at least one hundred firefighters and at least five support vehicles.

* * * * *